Patented Nov. 6, 1951

2,573,677

UNITED STATES PATENT OFFICE 2,573,677

PROCESS FOR THE PRODUCTION OF A PIGMENT COMPLEX, INCLUDING A REACTED STARCH

William L. Craig, Westport, Conn., assignor to R. T. Vanderbilt Company, Inc., New York, N. Y., a corporation of New York No Drawing. Application December 10, 1949, Serial No. 132,409

5 Claims. (Cl. 106—306)

1

This invention relates to improvements in the manufacture of pigments, particularly silicate pigments, and includes the pigments so produced.

Calcium silicate pigments are used in the rubber industry, due to the fact that they impart desirable properties to rubber when compounded therewith. They also find application in other fields, such as the manufacture of paint. Such pigments are conventionally manufactured by reacting sodium silicate and calcium chloride in aqueous solution, the pigments being precipitated in the process. The known methods of manufacture are, however, disadvantageous in that they are difficult to control in preparing precipitates of the proper particle size and cannot be operated at high rates of production.

The foregoing being in brief the state of the art, it is therefore the primary object of the present invention to provide an improved method for the preparation of pigments of the calcium silicate type, which method is not characterized by the disadvantages of the known methods.

It is also an object of the present invention to provide a novel pigment of the class indicated.

The process of the present invention includes as essential steps (1) the preparation of an aqueous solution containing a calcium chloride-starch complex, (2) the dilution with water of such aqueous solution, and (3) the admixing of such diluted solution with an aqueous solution of sodium silicate, resulting in the precipitation of the pigment.

In order to illustrate in detail the process, there is included the following example:

*Example.*—In 167 grams of water 111 grams of calcium chloride was dissolved to form a solution containing 40 per cent by weight of the salt. This solution was then filtered in order to remove suspended impurities, and was allowed to cool to 20–25° C. A slurry of 5.25 grams of potato starch was made in 36 grams of water, and this slurry was added to the filtered and cooled calcium chloride solution. Upon permitting this mixture, having a pH within the range of 6.5–7.5, to stand at 20–25° C. for a period of ten minutes, there was formed therein the calcium chloride-starch complex. Thereafter, the aqueous mixture containing that complex was diluted with 796 grams of water to form a mixture containing the complex.

There was also separately prepared a mixture of 2350 grams of water and 810 grams of a standard water glass silicate having a sodium oxide to silicon dioxide ratio of 1:3.25 and containing 39 per cent by weight of solids (sodium oxide plus silicon dioxide). This mixture containing 10 per cent by weight of solids was then slowly added with stirring to the aqueous solution containing the calcium chloride-starch complex, resulting in the formation of a precipitate. This precipitate was then separated by filtration, washed to remove impurities, dried, and ground to result in the finished pigment.

Various modifications may be made in the specific procedure of the example to provide other embodiments of the process of the present invention. Thus, in preparing the calcium chloride-starch complex, there may be used more dilute or more concentrated solutions of calcium chloride. It is necessary, however, that in preparing the complex the calcium chloride be present in the reaction mixture in the amount of at least 25 per cent by weight, and preferably 35 per cent by weight, based upon the amount of calcium chloride and water.

Also, in place of the potato starch used, there may be employed starches derived from other sources. Hence, cereal or stalk starches, which are produced from those portions of fibrous plants growing above the ground, may be employed, among them being cornstarch, wheat starch and rice starch. When these particular starches are used, however, a considerably longer time, for example, three or four hours, is required in order for the formation of the complex to take place. This is because granules of such starches have a tough, horny epidermis. When root starches, such as potato starch or tapioca starch are used, the time required for the formation of the calcium chloride-starch complex is only about three or four minutes. In general, the amount of time necessary for effecting the reaction between the calcium chloride and the starch depends upon the concentration of calcium chloride in the mixture, the type of starch used, the reaction temperature, the pH of the reaction mixture and the extent of agitation thereof.

In accordance with the present process, amounts of starch within the range from about 1.75 grams to about 17.5 grams, and preferably from about 3.5 to 7.0 grams, may be substituted for the specific amount shown in the specific example. That is, the amount of starch used is from about 1.58 to about 15.8 per cent, and preferably from about 3.15 to about 6.3 per cent, based upon the weight of the calcium chloride.

Also, as is illustrated by the example above, the formation of the calcium chloride-starch complex should be preferably effected at close to room temperature and under conditions which are approximately neutral.

In the step of diluting with water the concentrated mixture containing the calcium chloride-starch complex, such dilution will be to an extent such that the diluted solution contains 7.2 per cent or less by weight of combined calcium, and preferably from 1.8 to 5.4 per cent, based upon the amount of calcium chloride and water used.

In preparing the aqueous solution of sodium silicate used as a reactant, there may be taken any of the usual aqueous solutions of sodium silicate, preferably those containing sodium oxide and silicon dioxide in a molar ratio of at least 1:3. The aqueous solution of silicate admixed with the diluted solution containing the calcium chloride-starch complex should contain not more than 30 per cent by weight, and preferably from 5 to 15 per cent by weight of solids, that is, sodium oxide and silicon dioxide.

In effecting the reaction which results in the formation of the precipitate, the relative amounts of the two aqueous mixtures used should be such that approximately 3 moles of silicon dioxide per mole of calcium chloride used in preparing the complex are added to the reaction mixture. In carrying out this step, the silicate solution may be added to the solution containing the calcium chloride-starch complex, or this order of addition may be reversed. In the production of pigments upon a large scale, however, it is preferred to bring together in a small, enclosed chamber under contant, vigorous agitation properly proportioned streams of the two reacting aqueous mixtures.

Upon filtering and washing the precipitate and drying it at moderate temperatures (for example, 100° C.), there results a cake which may easily be dispersed and ground to the desired size to form a finished pigment which is characterized by its brightness in color and by its low specific gravity. This pigment will contain from about 0.5 to 5 per cent by weight, and preferably from about 1 to 2 per cent by weight, of starch, and will have a calcium oxide to silicon dioxide ratio of about 1:3. The pigment is useful in the compounding of rubber, in paints, in paper coatings and in ceramics.

I claim:

1. A method for the preparation of a pigment which comprises reacting calcium chloride and starch in an aqueous mixture maintained at a temperature of from about 20 to 25° C. to form the calcium chloride-starch complex, said mixture containing at least about 25 per cent by weight of the calcium chloride, based upon the weight of the water and calcium chloride, and said mixture containing from about 1.58 to about 15.8 per cent by weight of starch, based upon the weight of the calcium chloride, diluting the mixture with water until it contains not more than 7.2 per cent by weight of combined calcium, based upon the weight of the calcium chloride and water used, and reacting the diluted mixture with an aqueous solution of sodium silicate containing not more than 30 per cent by weight of combined sodium oxide and silicon dioxide in proportion such that the reacting mixtures contain substantially 1 gram atomic weight of combined calcium per 3 gram molecular weights of combined silicon dioxide to form a precipitate.

2. A method for the preparation of a pigment which comprises reacting calcium chloride and starch in an aqueous mixture under substantially neutral conditions and at substantially room temperature to form the calcium chloride-starch complex, said mixture containing at least about 35 per cent by weight of calcium chloride, based upon the weight of water and calcium chloride, and said mixture containing from about 3.15 to about 6.3 per cent by weight of starch, based upon the weight of the calcium chloride, diluting the mixture with water until it contains from about 1.8 to about 5.4 per cent by weight of combined calcium, based upon the weight of the calcium chloride and water used, and reacting the diluted mixture with an aqueous solution of sodium silicate having a molar ratio of sodium oxide to silicon dioxide of at least 1:3 and containing from about 5 to about 15 per cent by weight of combined sodium oxide and silicon dioxide in proportion such that the reacting mixtures contain substantially 1 gram atomic weight of combined calcium per 3 gram molecular weights of combined silicon dioxide to form a precipitate.

3. A process as in claim 2 in which the reaction resulting in the formation of the precipitate is carried out by bringing together the reacting mixtures in a small, enclosed chamber under constant, vigorous agitation.

4. A precipitated calcium silicate pigment produced in accordance with the method of claim 1.

5. A precipitated calcium pigment produced in accordance with the method of claim 2.

WILLIAM L. CRAIG.

REFERENCES CITED

The following references are of record in the file of this patent:

UNITED STATES PATENTS

| Number | Name | Date |
| --- | --- | --- |
| 1,273,571 | Bloede | July 23, 1918 |
| 2,188,494 | Bode | Jan. 30, 1940 |
| 2,457,797 | Craig | Jan. 4, 1949 |

Certificate of Correction

Patent No. 2,573,677                                                           November 6, 1951

WILLIAM L. CRAIG

It is hereby certified that error appears in the printed specification of the above numbered patent requiring correction as follows:

Column 4, line 40, strike out "in a small, enclosed chamber"; and that the said Letters Patent should be read as corrected above, so that the same may conform to the record of the case in the Patent Office.

Signed and sealed this 19th day of February, A. D. 1952.

[SEAL]

THOMAS F. MURPHY,
*Assistant Commissioner of Patents.*